United States Patent Office 2,899,442
Patented Aug. 11, 1959

2,899,442
CERTAIN IMIDAZOLIDINEGUANYLIMINE COMPOUNDS

William B. Hughes, Webster Groves, Mo., assignor to Cities Service Research and Development Company, New York, N.Y., a corporation of New Jersey No Drawing. Application December 31, 1957
Serial No. 706,275

4 Claims. (Cl. 260—309.7)

This invention relates to inhibiting corrision of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, event with their use corrosion continues to such an extent as to pose a serious economic problem.

I have now discovered that corrosion of the type described may be substantially inhibited by introducing into the production, collection and distribution lines as well as equipment associated therewith, including tanks, tank cars and the like, a small but sufficient quantity of a reaction product obtained by first reacting a polyamine with dicyandiamide to produce an aminoethyl imidazolidine-guanylimine compound which is thereafter reacted with urea, thiourea or another mol of dicyandiamide. The final reaction product resulting is one which unexpectedly possesses superior corrosion inhibiting properties.

In preparing these new products which have been found to be uniquely effective in reducing corrosion of the type described, the intermediate aminoethyl imidazolidine-guanylimine compound is first prepared by reacting one mol of a polyamine, preferably a polyethyleneamine, with one mol of dicyandiamine under conditions which effect the removal of one mol of ammonia from the reaction mixture. To produce the desired product, the intermediate aminoethyl imidazolidine-guanylimine resulting is then further reacted with urea, thiourea or dicyandiamide in the molar ratio of two mols of the aminoethyl imidazolidine-guanylimine to one mol of the urea or dicyandiamide compound.

The new compounds resulting from the foregoing reaction may be characterized by the following formula

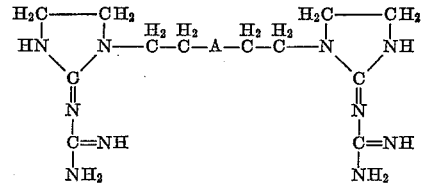

wherein A is selected from the group consisting of

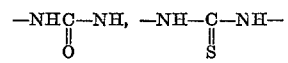

and

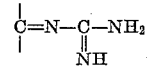

In preparing products of the foregoing structure, it will be necessary to use a polyamine which includes at least two alkylene groupings such as is found in diethylene triamine. Other higher molecular weight polyamines and preferably polyethyleneamines may be used if desired.

In producing an intermediate aminoethyl imidazolidine-guanylimine the polyamine and dicyandiamide are heated at a temperature of about 180° C. until no further evolution of ammonia is noted. The time required to accomplish this will normally be from two to about four hours depending upon the quantities of reactants used and the temeprature at which heating is carried out. After recovery of the intermediate aminoethyl imidazolidine-guanylimine product, the reaction with urea, thiourea or the dicyandiamide is accomplished in a similar manner with two mols of ammonia being removed from the reaction zone.

In order to more fully understand the nature of the compounds of my invention, the manner in which they are prepared and the method by which they may be utilized in protecting metallic surfaces from corrosive action the following specific examples are provided:

EXAMPLE 1

To 84 grams (1 mol) of dicyandiamide, 103 grams of diethylene triamine was added. To this mixture one mol of hydrochloric acid (5%) was cautiously added. The mixture was then heated with stirring to evaporate water and heating continued for a period of about four hours at a temperature of between 140 and 150° C. The product resulting was then neutralized with sulphuric acid with a white crystalline material being produced. The white crystals were recrystallized from cold water and dried and decomposed by treatment with sodium bicarbonate solution. Water present in the solution was evaporated at atmospheric pressure until excessive foaming occurred at which time benzene was added and water was removed by azeotropic distillation. After removal of excess benzene a colorless syrup, the intermediate aminoethyl imidazolidine-guanylimine compound, remained.

To 17 grams of the intermediate product (.1 mol) 3.0 grams (.05 mol) of urea was added. Heat was applied to the reaction mixture with ammonia being rapidly given off at a temperature of about 150° C. After ammonia evolution was complete, heating was discontinued and a resulting dark colored product dispersible in oil remained. This product tested as a corrosion inhibitor provides the protection indicated under Inhibitor No. 1 in the table which follows.

EXAMPLE 2

In a manner similar to that set forth in Example 1 above, .1 mol of the intermediate aminoethyl imidazolidine-guanylimine product was reacted with 4 grams of thiourea. The product resulting was dark in color and soluble in oil. This product provides corrosion protection as indicated for Inhibitor No. 2 in the table which follows.

EXAMPLE 3

In a manner similar to the foregoing examples, 17 grams (.1 mol) of the aminoethyl imidazolidine-guanylimine intermediate product, prepared according to Example 1, was reacted with 8.4 grams (.1 mol) of dicyandiamide under conditions which effect removal of 2 mols of ammonia. The product recovered was preferably water soluble and readily dispersible in oil. The product is identified as Inhibitor No. 3 in the table which follows.

In all of the foregoing examples it would be noted that the intermediate aminoethyl imidazolidine-guanylimine product used was the product prepared with diethylene triamine. It is, of course, understood that other similar polyamines such as triethylene tetramine and tetraethylene pentamine can also be used. Products prepared according to the foregoing examples with the higher molecular weight polyamines mentioned are somewhat less soluble in oil and therefore less effective as corrosion inhibitors in the manner in which the preferred compounds of the present invention are used.

The effectiveness of these new compounds in reducing corrosion in gas and oil well production, collection, distribution and storage equipment, as well as other metal surfaces exposed to corrosive fluids, may be more fully understood by reference to certain corrosion tests which I have conducted using an acidic brine solution to substantially duplicate well or pipe line conditions. The specific test procedure utilized herein is designed to simulate conditions existing in a gas condensate well. The test technique makes use of an apparatus which deposits a test panel alternately through two phases at the rate of three times per minute. The corrosive mixture or medium is held in a one-liter, three-necked, round bottom flask equipped with a heater, a mercury sealed stirrer, a reflux condenser, and an inlet for passing gas into the bottom of the corrosive liquid. In the test, the stirrer is replaced by a glass hook arranged to carry the test piece. The dipping apparatus is powered by a small electric motor through a cam connection.

The corrosive medium employed was a 5% sodium chloride solution to which has been added 0.2 ml. of a mixture of 50 weight percent formic acid and 50 weight percent acetic acid. To this acid mixture, a varying amount of kerosene is added (10 to 400 ml.) and carbon dioxide or natural gas allowed to pass through the mixture during the test. The variation of kerosene volume permits the test to more nearly simulate conditions existing either in a condensate well or a gas pipe line.

In running the test, the corrosive medium is heated to boiling and the gas introduced. A punched, cleaned, weighed test panel, made of 18 gauge, cold rolled steel, measuring ⅞" x 1", was suspended on the glass hook and the dipping process started. The test is normally run for 90 minutes. At the end of this time, the test panel is removed, cleaned, dried and weighed to give a blank loss. The inhibitor is then introduced to the corrosive medium, the test panel replaced, and the test again continued for an additional 90 minutes. At the end of this time, the panel is again cleaned and weighed to give an inhibited test loss.

The changes in weight of the test strips during the test were taken as a measurement of the effectiveness of the inhibitor composition. By this means, a percentage protection may be calculated for each inhibitor in accordance with the following formula:

$$\frac{L1-L2}{L1} \times 100 = \text{percent protection}$$

in which L1 is the loss in weight of the strips taken from the uninhibited test, and L2 is the loss in weight of the strips taken from the inhibited test.

The table which follows shows the average percent protection obtained from tests conducted on the new compounds of my invention in the amounts recorded.

Table

| Inhibitor Number | Composition | Percent Protection | | |
|---|---|---|---|---|
| | | 25 p.p.m. | 50 p.p.m. | 100 p.p.m. |
| 1 | DETA[1] Dicyandiamide Urea 2:2:1 | 70.1 | 87.9 | 99.8 |
| 2 | DETA[1] Dicyandiamide Thiourea 2:2:1 | 88.9 | 98.6 | 99.1 |
| 3 | DETA[1] Dicyandiamide 2:3 | 93.6 | 94.3 | 98.9 |

[1] Diethylene triamine.

It will be evident from the foregoing table that the new compounds of my invention provide a substantial amount of protection against the corrosive fluids normally passing through well tubes and associated gathering equipment.

While the tests were conducted with varying amounts of inhibitor as indicated in the table at 25, 50 and 100 p.p.m. more or less inhibitor may be used in field operations depending upon the particular problem faced. In field use, the concentration of inhibitor will vary in accordance with the particular conditions found. As has been experienced over periods of time, the corrosivity of a particular well may vary widely, thus necessitating changes in the amount of inhibitor added. The inhibitors of the present invention will normally be used in amounts of from 10 to 1500 p.p.m. and generally not more than about 1000 p.p.m. Their use, of course, at the present time is somewhat limited by their cost. It would be desirable to use substantial quantities of inhibitor in view of the high losses due to corrosion, but the comparatively high cost of compounds of this type limits the amount which can be economically added for protection purposes.

In utilizing these new compounds, it has been found that excellent results are obtained by dissolving them in an appropriate amount of water or other inert solvent such as kerosene or the like. The use of such a solvent permits easy handling and is a convenient means for injecting inhibitor into the well or transfer lines. When utilized in pipe lines, the gas or oil flowing through the lines is effective to mix the inhibitor with the corrosive fluid present, sweeping the same through the system and thereby providing protection for the metal equipment with which it comes in contact after the point of injection.

It is to be understood that the improved compositions of my invention are not limited to use alone and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. Compounds having the formula
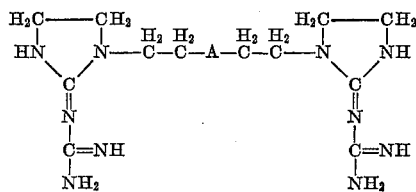
wherein A is selected from the group consisting of
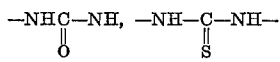
and
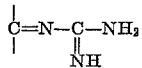
2. As a new composition, the compound
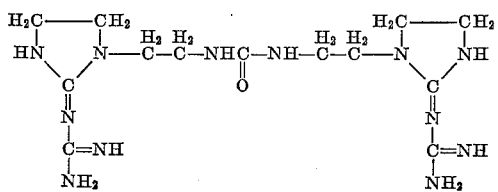
3. As a new composition, the compound
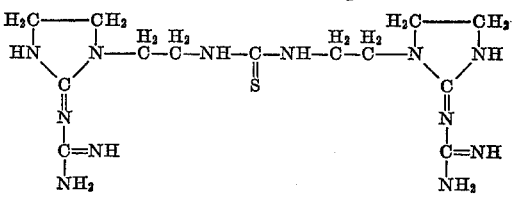
4. As a new composition, the compound
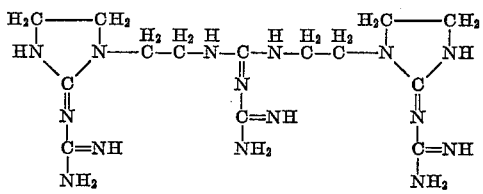
References Cited in the file of this patent
UNITED STATES PATENTS
| | | |
|---|---|---|
| 2,483,969 | Gajewski | Oct. 4, 1949 |
| 2,613,212 | Hurwitz et al. | Oct. 7, 1952 |
| 2,622,075 | Hemmi et al. | Dec. 16, 1952 |
FOREIGN PATENTS
| | | |
|---|---|---|
| 593,659 | Great Britain | Oct. 22, 1947 |
| 253,709 | Switzerland | Nov. 16, 1948 |